Figure 1:
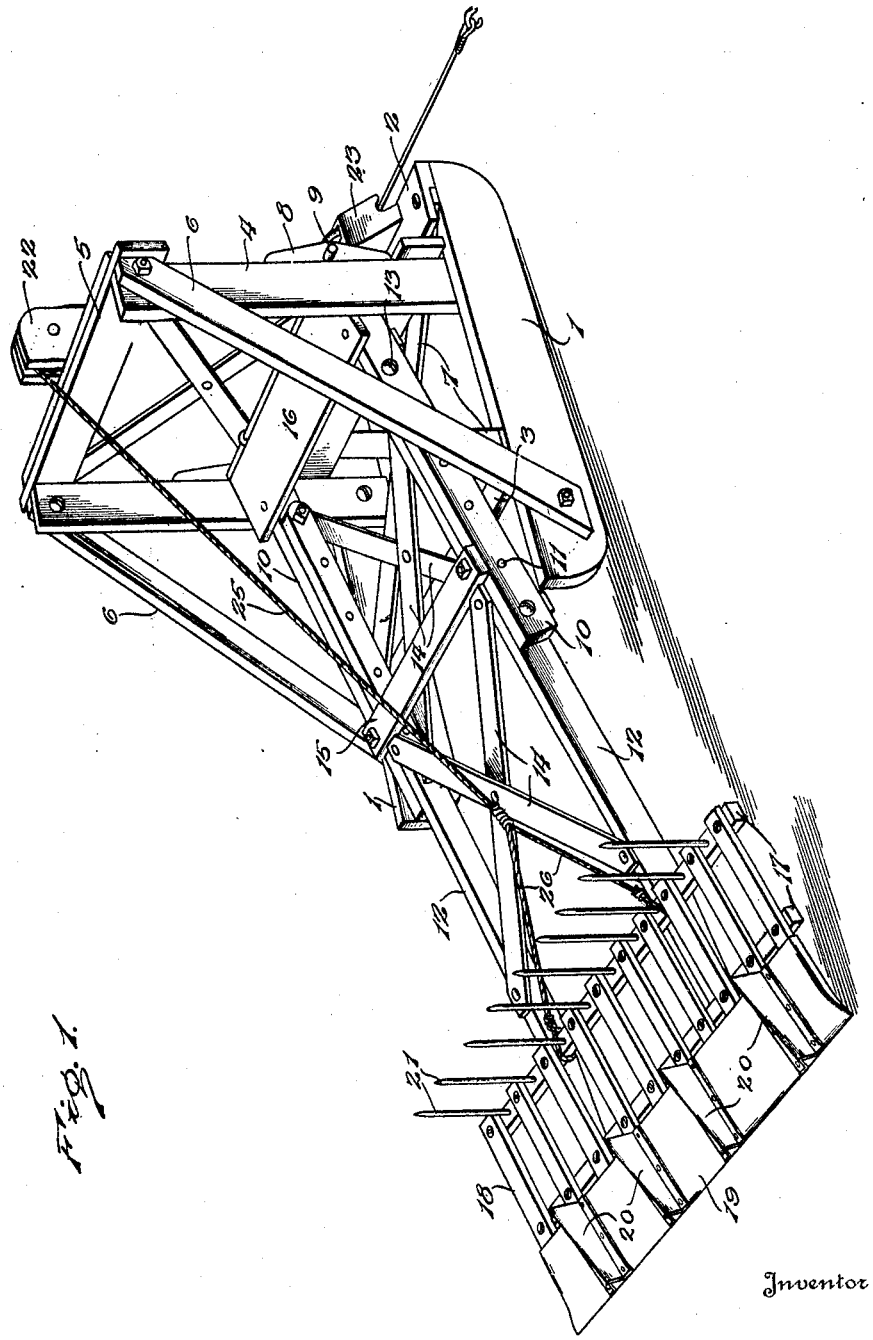

May 18, 1926.  
J. P. OLSON  
HAYSTACKER  
Filed June 12, 1925   2 Sheets-Sheet 1

1,585,313

Inventor

J. P. Olson

By Lacy & Lacy, Attorneys

May 18, 1926.
J. P. OLSON
HAYSTACKER
Filed June 12, 1925 2 Sheets-Sheet 2
1,585,313
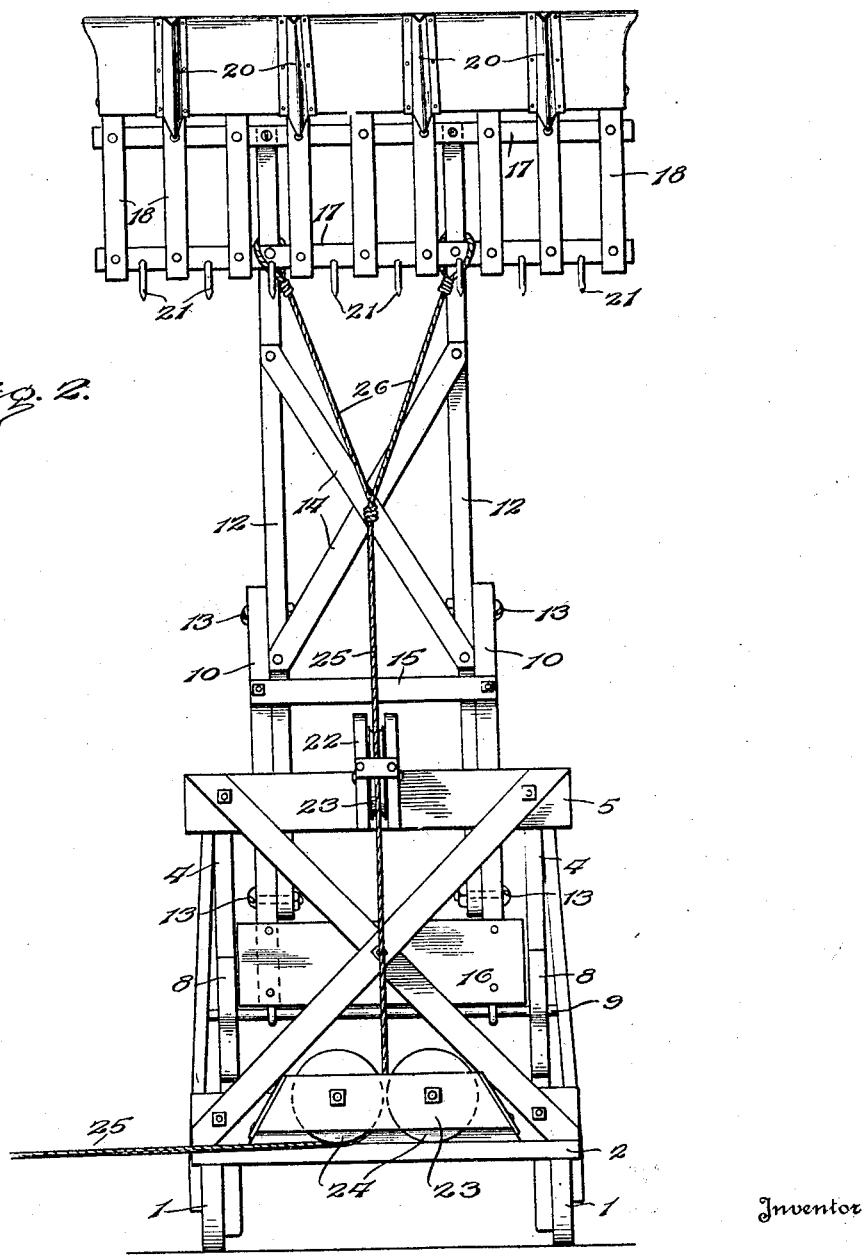

Patented May 18, 1926.

1,585,313

UNITED STATES PATENT OFFICE.

JAMES P. OLSON, OF MOBILE, ALABAMA.

HAYSTACKER.

Application filed June 12, 1925. Serial No. 36,735.

This invention relates to hay stackers and has for its object the provision of a simple and efficient apparatus whereby hay may be placed upon a stack without waste. The invention seeks to provide a device which may be adjusted easily to the height of the stack and which will be provided with means whereby the hay will be delivered onto the stack without any of the hay clinging to the lifting or stacking element as the latter recedes from the stack. The invention also has for its object the provision of a stacker which may be produced at a low cost and which will be very strong and durable. The invention is illustrated in the accompanying drawings and will be hereinafter fully set forth.

In the drawings:

Figure 1 is a perspective view of my improved hay stacker showing the same lowered in position to receive a load of hay, and Fig. 2 is a rear elevation showing the lifting element or platform in its raised position.

In carrying out my invention, I provide a pair of runners 1 which may be of any preferred dimensions and are connected by cross bars 2 and 3 whereby they will be held rigidly in parallel relation. A pair of standards 4 are erected upon the runners and are connected at their upper ends by a cross bar 5 so that they will be firm and will effectually withstand the strains placed thereon in the use of the apparatus. Inclined braces 6 are also provided secured to and extending between the upper ends of the standards and the front ends of the runners to impart further rigidity to the structure. If preferred, diagonal braces 7 may be also secured to and extend between the runners so that a very firm support will be produced. Secured upon the standards are bearing blocks 8 in which is mounted a shaft or fulcrum rod 9, and fitted upon this shaft or rod for rocking movement in a vertical plane are side bars or arms 10 which are provided with a longitudinal series of openings 11 whereby similar side bars 12 may be secured to the bars 10 by engaging bolts 13 through any one of the openings. The bars 12 are disposed at the inner sides of the side bars 10 and are connected by diagonal braces 14 so that the needed strength is maintained. Cross bars 15, 16 are secured to the side bars 10 adjacent the respective ends thereof so that the side bars will be maintained in fixed parallel relation and will constitute a strong support for the platform or hay moving member. As shown in the drawings, the platform or hay-lifting member comprises cross bars 17 which are rigidly secured to the outer ends of the side bars 12, as shown clearly in Fig. 2. Secured upon the cross bars 17 at intervals through the length thereof are slats 18 which project beyond the outer cross bar and have their ends covered by a plate 19 which is secured thereto. This plate 19 may advantageously be formed from sheet metal, and projecting from the working face of this guard or covering plate are guards or cleats 20 for a purpose which will presently appear. Secured in and rising from the inner cross bars 17 are elongated pins or teeth 21, the purpose of which will also presently appear.

Secured upon the cross bar 5, at the center of the same, is a bracket 22 of any convenient or preferred type and mounted in said bracket is a guide roller 23. Secured upon the cross bar 2 below the bracket 22 is a bearing block or casing 23 in which rollers 24 are mounted. An operating cable 25 has a forked or branched front end 26 secured in any preferred manner to the cross bar 17 of the platform, and this cable extends over the pulley 23 and between the pulleys 24, then extending under either pulley to one side accordingly as the power is to be applied from the right or the left.

The operation will, it is thought, be readily understood. The hay or other material to be stacked is loaded onto the platform and will be retained thereon by the elongated pins or teeth 21 and the cleats 20. When the platform is loaded, a pull is exerted upon and through the operating cable, whereupon the platform will be raised, the supporting elements 10 and 12 swinging upon the shaft or rod 9 as a center. When the platform reaches its highest position, which is determined by the side bars impinging against the cross bar 5, the hay will slide from the platform onto the stack, and it will be readily understood that the side bars 12 may be adjusted longitudinally with respect to the side bars 10 as the height of the stack increases. When the hay has been delivered onto the stack, the operating cable is permitted to slacken and the platform will then return to the ground to receive another load. The pins 21 may penetrate the load placed upon the platform and the cleats 20 will abut the load to thereby effectually retain the load while it is being lifted, but when the platform has been fully raised the weight of the load will cause it to slide from the pins and the platform onto the stack, and this action will be accelerated by the slight jar due to impact of the platform support or carrying arms against the upper cross bar 5 of the supporting frame. When the platform recedes from the stack, no hay will cling to it inasmuch as the ends of the slats 18 are all covered by the plate 19 and the cleats 20 will obviously move easily from the load without any holding action thereon. It will be noted that the cleats or guards 20 are larger at the ends adjacent the slats 18 than at the opposite ends so that the hay may be readily moved over the plate 19 onto the slats but will not easily move backward.

The apparatus may, of course, be moved from point to point as needed, and when at rest will remain fixed and steady inasmuch as the runners provide a sufficient base to avoid twisting or rocking of the supporting frame. The device is exceedingly simple in construction and may be operated easily so that large stacks may be formed expeditiously and with less labor than would otherwise be necessary.

Having thus described the invention, I claim:

1. A stacker comprising arms mounted for rocking movement, a platform carried by said arms and consisting of a pair of cross bars secured directly to the arms and slats carried by and projecting beyond the cross bars, a plate secured upon and covering the outer ends of all the slats, and cleats secured upon the upper side of said plate parallel with said slats.

2. A stacker comprising arms mounted for rocking movement, a platform carried by the outer ends of said arms and consisting of a pair of cross bars secured directly to the arms and a plurality of slats secured upon and projecting beyond the said cross bars, a plate extending across and covering the outer ends of all the slats, cleats upon said plate, said cleats being V-shaped in cross section and tapered toward the free edge of the plate, and elongated teeth extending from the inner cross bar between the slats.

In testimony whereof I affix my signature.

JAMES P. OLSON. [L. S.]